Patented Mar. 5, 1935

1,993,542

UNITED STATES PATENT OFFICE 1,993,542

PROCESS FOR THE PRODUCTION OF TERTIARY AMINES AND PRODUCTS PRODUCED THEREBY

Saul Caspe, Brooklyn, N. Y.

No Drawing. Application February 28, 1930, Serial No. 432,264

11 Claims. (Cl. 260—127)

My invention relates to processes for the production of tertiary amines, their homologues and derivatives and to new and valuable compounds produced thereby.

I have found that halogen substituted compounds of the aliphatic series can be converted into tertiary amino compounds by treating said halogen compounds with alkyl-amines in the presence of catalysts, and that the production of the tertiary amino compounds occurs without the necessity of increased pressures.

The present known methods for the production of tertiary amines of the character described employs autoclaves, and similar devices, in order to obtain increased pressures and hence in addition to the expense and difficulty of operation of devices of this character, the greatest care must be exercised in the application of the required temperature and pressure, both of which affect the final results as to yield and quality of produced products.

I have overcome the above mentioned, and other, objectionable features of the present employed processes in that I employ a reflux condenser, thus obtaining an approximately uniform temperature throughout the reaction and obtaining practically theoretical yields of the produced compounds.

I give the following as one method of the process of my invention:—

1 mol isopropyl bromide, 1 mol diethylamine and .5 mol glycerine are heated together in a reflux condenser for several days. The mixture is made alkaline with sodium hydrate and extracted several times with ether. The ether solution is dried with potassium hydrate sticks, filtered, evaporated and the diethyl-iso-propylamine thus formed is distilled. The diethyl-iso-propylamine thus formed has the formula

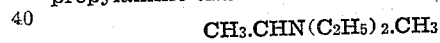
$CH_3.CHN(C_2H_5)_2.CH_3$ with a boiling point of 108–109° C.

I do not limit myself to the isopropyl bromide mentioned in the above example, as other similar halogen compounds can be employed such as the halogenated compounds of the isomeric propyl compounds, butyl compounds and the other homologues of this chemical series, and halogen compounds other than the bromide may be employed among which are the chlorides and iodides.

Neither do I limit myself to the particular diethylamine mentioned in the above example, as other alkyl amines may be employed, among which are ethylamine and dimethylamine, methylamine and similar amines.

Among the metallic catalysts suitable for my purpose are copper and platinum and among the organic compounds suitable as catalysts are the poly hydroxy alcohols such as glycol, glycerol, and mannitol.

By "catalysts" in my specification and claims, I mean those compounds which cause the production of the claimed tertiary amines under atmospheric pressure where such production is not possible in the absence of such catalysts.

What I claim is:—

1. As a new product, diethyl-iso-propylamine of the formula $CH_3.CHN(C_2H_5)_2.CH_3$ and having a boiling point of approximately 108°–109° C.

2. A process for the production of diethyl-iso-propylamine which consists in heating iso-propyl-bromide with N, N' diethylamine in the presence of glycerine.

3. A process for the production of diethyl-iso-propylamine which consists in heating iso-propyl-bromide with N, N' diethylamine in the presence of glycerine under a reflux condenser.

4. A process for the production of tertiary amines which consists in heating an alkyl halide of the aliphatic series having not more than 5 carbon atoms with a dialkyl amine having not more than 5 carbon atoms in the presence of glycerine.

5. A process for the production of tertiary amines which consists in heating an alkyl monohalide of the aliphatic series having not more than 5 carbon atoms with a dialkyl amine having not more than 5 carbon atoms in the presence of glycerine.

6. A process for the production of tertiary amines which consists in heating an alkyl monobromide of the aliphatic series having not more than 5 carbon atoms with a dialkyl amine having not more than 5 carbon atoms in the presence of glycerine under a reflux condenser.

7. A process for the production of tertiary amines which consists in heating an alkyl halide of the aliphatic series having not more than 5 carbon atoms with a dialkyl amine having not more than 5 carbon atoms in the presence of a poly-hydroxy alcohol catalyst.

8. A process for the production of tertiary amines which consists in heating an alkyl monohalide of the aliphatic series having not more than 5 carbon atoms with a dialkyl amine having not more than 5 carbon atoms in the presence of a poly-hydroxy alcohol catalyst.

9. A process for the production of tertiary amines which consists in heating an alkyl halide of the aliphatic series having not more than 5 carbon atoms with a di-alkyl amine having not more than 5 carbon atoms in the presence of glycerine.

10. A process for the production of tertiary amines which consists in heating an alkyl monohalide of the aliphatic series having not more than 5 carbon atoms with a di-alkyl amine having not more than 5 carbon atoms in the presence of glycerine.

11. A process for the production of tertiary amines which consists in heating an alkyl monobromide of the aliphatic series having not more than 5 carbon atoms with a di-alkyl amine having not more than 5 carbon atoms in the presence of glycerine under a reflux condenser.

SAUL CASPE.